United States Patent
Findeisen

(10) Patent No.: US 7,426,731 B2
(45) Date of Patent: Sep. 16, 2008

(54) DETERMINING PROCESSOR USAGE BY A THREAD

(75) Inventor: Piotr Findeisen, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 915 days.

(21) Appl. No.: 10/805,934

(22) Filed: Mar. 22, 2004

(65) Prior Publication Data

US 2005/0229176 A1    Oct. 13, 2005

(51) Int. Cl.
*G06F 9/46* (2006.01)
*G06F 9/44* (2006.01)

(52) U.S. Cl. .............. 718/104; 718/106; 717/127
(58) Field of Classification Search .......... 718/100, 718/101, 102, 108, 104; 717/127; 380/230
See application file for complete search history.

(56) References Cited

U.S. PATENT DOCUMENTS

| 5,339,425 | A | * | 8/1994 | Vanderah et al. ......... 718/102 |
| 5,490,272 | A | * | 2/1996 | Mathis et al. ............ 718/108 |
| 5,774,718 | A | * | 6/1998 | Aoshima et al. ......... 718/100 |
| 5,812,844 | A | * | 9/1998 | Jones et al. ............. 718/104 |
| 5,875,464 | A | * | 2/1999 | Kirk ..................... 711/129 |
| 6,658,654 | B1 | * | 12/2003 | Berry et al. ............ 717/131 |
| 2002/0078121 | A1 | * | 6/2002 | Ballantyne ............. 709/102 |
| 2002/0174164 | A1 | * | 11/2002 | Hayashi ............... 709/102 |
| 2003/0018686 | A1 | * | 1/2003 | Kalafatis et al. ........ 709/102 |

OTHER PUBLICATIONS

Jones et al., CPU reservations and time constraints: efficient, predictable scheduling of independent activities, 1997, ACM, pp. 198-211.*
Ford et al., CPU inheritance scheduling, 1996, ACM, vol. 30, Issue S1, pp. 91-105.*
Xu et al., Dynamic instrumentation of threaded applications, 1999, ACM, pp. 49-59.*
Flautner et al., thread-level parallelism and interactive performance of desktop applications, 2000, ACM, pp. 129-138.*

* cited by examiner

*Primary Examiner*—Meng-Ai An
*Assistant Examiner*—Caroline Arcos

(57) ABSTRACT

Elapsed times between execution points of a thread are determined based on start times and stop times associated with the execution points. For each elapsed time, it is determined whether the thread was idle during the elapsed time by comparison of the elapsed time to a first threshold value. Each elapsed time is reduced to a selected value during which the thread was idle. A value indicative of processor usage by the thread is determined as a function of the elapsed times.

19 Claims, 4 Drawing Sheets

DETERMINING PROCESSOR USAGE BY A THREAD

FIELD OF THE INVENTION

The present disclosure relates to determining processor usage by a thread.

BACKGROUND

Modern programming languages and operating systems often allow the use of multithreading, or threads. A thread is a separate path of execution within a single process or program running on an operating system. Various schemes of threading are used, some differing on whether the threads are based in user space or in kernel space. Also, the performance of threaded programs may depend on the target hardware. On multi-processor computers, the threads may be allocated to different central processing units for true simultaneous execution. On a single processor computer, a scheduler prioritizes and schedules instructions between various thread within a process, which gives the appearance that the threads are running simultaneously.

Generally, threads of execution may share memory and processing resources of the parent process. By programming with threads, developers are able to take advantage of parallel computing models without the complexities inherent, for example, in inter-process communications. Programming with threads still requires special precautions, such as synchronization of data and dealing with race conditions. Nonetheless, threads may be an optimal solution for many data processing tasks.

Another complexity inherent in the use of threads is determining processor usage by the threads. When trying to improve a program's performance, it is often necessary to determine how time is spent by the processor in executing code. By identifying parts of a program (e.g., method, thread, etc.) that require the most amount of time to execute, the programmer can more efficiently focus on optimizing those parts first.

Performance monitoring tools are often used to provide processor usage time of various parts of code. This type of tool is referred to as a profiler. Profiling is a process in which specific information about the dynamic execution of a program is collected. Such information often includes execution times of individual components of programs, such as functions, methods or loops. Profilers typically work by determining CPU time used by a process, along with other performance information, for particular code regions.

Profilers are generally useful in characterizing performance based on function calls within a single-threaded or multi-threaded application. It is a common practice for profilers to collect data separately for each thread. However, profilers do not always provide accurate performance measurements on a thread-by-thread basis.

Some profiler implementations use a simple approach of determining CPU time of a thread by examining the CPU clock time before and after a thread's code region is executed. This approach determines the amount of time the process spent on that code region. This approach, however, fails to account for the fact that the thread may have been idle for some period of time between the beginning and end of the code region. This idle time may be the result of a scheduler switching in code regions of another thread that is concurrently running, only later to resume executing the thread being measured. The thread might also be idle while it or some other task is waiting on input/output (I/O) to complete, such as that which occurs via processor interrupts.

SUMMARY

A method, system, and apparatus are disclosed for determining processor usage by a thread. Elapsed times between execution points of the thread are determined based on start times and stop times associated with the execution points. For each elapsed time, it is determined whether the thread was idle during the elapsed time by comparison of the elapsed time to a first threshold value. Each elapsed time during which the thread was idled is reduced to a selected value. A value indicative of processor usage by the thread is determined as a function of the elapsed times.

DETAILED DESCRIPTION

Figure 1:
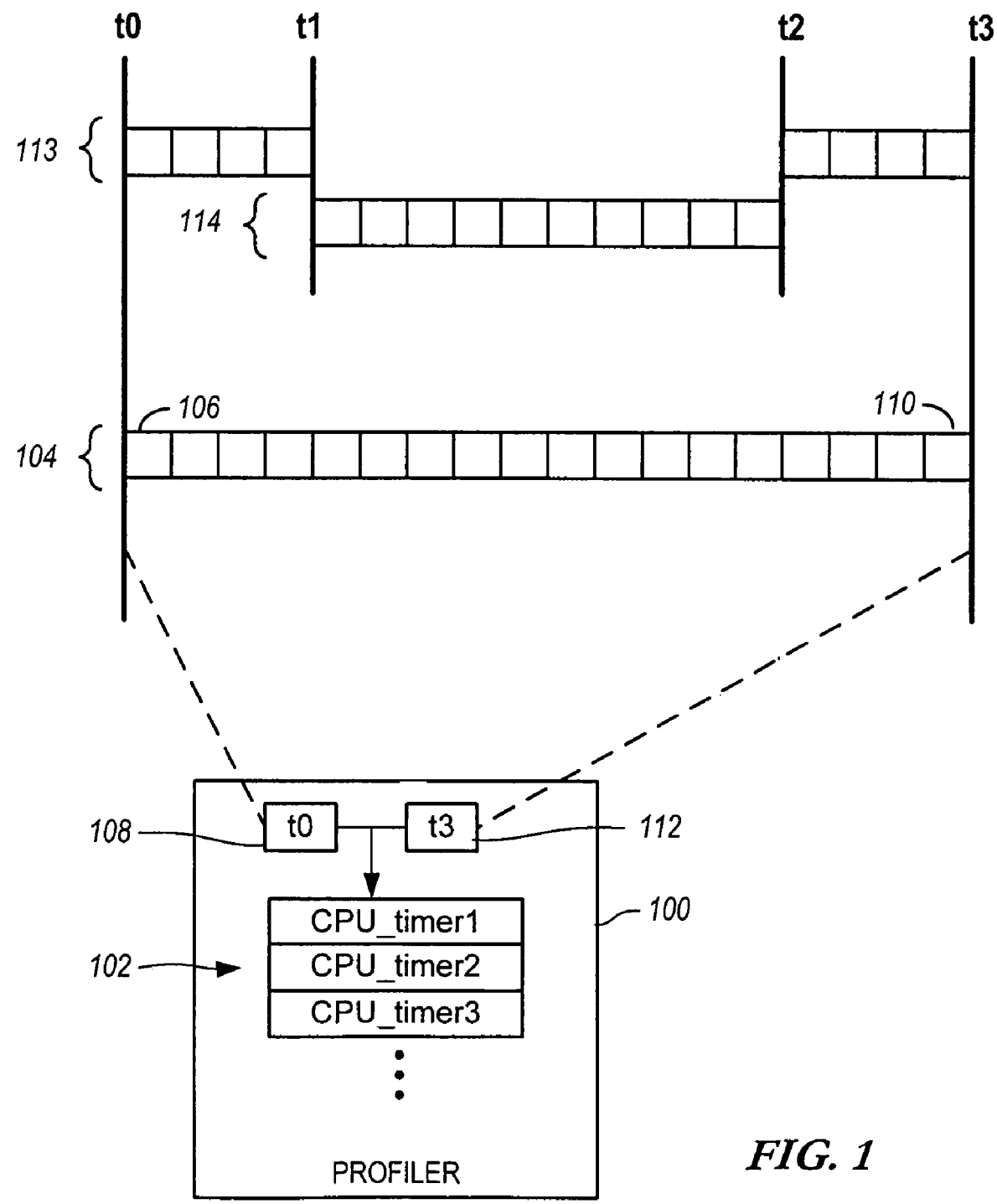
FIG. 1 illustrates a thread profiler operation according to embodiments of the invention.

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

In general, the present disclosure relates to software performance profiling tools for measuring CPU time of multi-threaded programs. The profiling tools are adapted to accurately measure CPU time used by a program on a per-thread basis. The profiling tools may be adapted for any coding language (e.g., C/C++, Java, Ada, etc.) as well as operating environments and/or system (Linux, Unix, Windows, Java Virtual Machine, etc.). The profiling tools may be provided alone or as part of a software development package (e.g., compiler, debugger, virtual machine, etc.).

The profiling tools work on the assumption that the operating system and hardware are capable of providing a clock time with high-resolution. The high-resolution clock time should have sufficient precision to discern processor events (e.g., the execution of a single instruction). Typically this requires providing clock times having precision on the order of a nanosecond. Many popular processor architectures, including those marketed by Intel® (both Pentium® and Itanium® lines), or Hewlett-Packard® (PA-RISC line) offer such capabilities. These processors offer a special hardware register which is incremented with every hardware clock cycle. The contents of this register can be retrieved by any application without the need of making a system call. This makes access to this register quick and efficient.

Most often used forms of execution times measured by profilers include so called "clock times" and "CPU times". Clock time spent during execution of a given fragment of code is the time that has passed between the start and finish of the code according to some external observer. On the other hand, the CPU time is the time that the computer processor used to execute the given code. For each fragment of code, its clock execution time is never less than its CPU execution time, but it can be larger, due to several reasons. One possible reason is that the code in question executed an operation that did not require the CPU to run it. Such actions are input/output operations, or waiting for a specific event to occur. Another reason, which can often take place in multi-programming and time-sharing environment is that the processor executing a given thread may temporarily abandon executing of the thread and continue executing another thread.

Generally, the clock time is relatively straightforward to measure, because it requires only access to an independent clock. The CPU time measurement is more challenging, because it requires not only access to the clock but also the knowledge about many events that may have happened during the measurement time. One design goal of a profiler is to providing an accurate CPU time measurement on a per-thread basis.

In reference now to FIG. 1, the operation of a profiler 100 is illustrated according to embodiments of the present invention. One function of the profiler 100 is to keep track of CPU times used on a per-thread basis. The profiler 100 maintains a collection of accumulated CPU times 102 for each thread that is being tracked. The CPU times are updated each time a certain thread activity takes place. This activity typically involves a code section being entered and exited by a thread.

A code section may include any arbitrary sequence of instructions in a computer program. Typically, however, profilers track performance characteristics on a per-function basis. Functions may also be referred to as methods, procedures, subprograms, routines, and/or subroutines. In such an arrangement, the profiler 100 makes time measurements beginning when the function is entered and ending when the function is exited. It will be appreciated that profilers may also be used to track other portions of code within a function, such as loops or blocks located within braces ("{ }") in C, C++, and Java code.

The elapsed clock time (as opposed to CPU time) for executing a portion of code can be measured by retrieving the hardware clock timer values just before and just after executing the code fragment. The clock time elapsed between two consecutive events is calculated as the difference between the two timer value, and may be referred to as elapsed time. In other words, the elapsed time is the difference in the hardware clock timer values retrieved at the beginning and at the end of the given fragment of code.

The elapsed time cannot always be used to accurately measure the CPU time consumption by a thread. This is because the thread in question can become idle as a result of the operation executed by the thread, or as a result of the kernel action. In particular, the kernel may switch from one thread to another at any time. The thread switches, also called context switches, are unpredictable from the perspective of the running threads. Therefore, to measure the processor time spent during execution of a fragment of code using the elapsed time, the correct results would be obtained only if the thread was not preempted during the measurement period. Since the thread switching must not change the behavior of the threads, some operating system kernels make it impossible for the applications to tell not only when the thread switches occurred, but even whether they occurred at all.

This characteristic of elapsed time measurements is shown in FIG. 1. In the example of FIG. 1, a section of code is executed by a thread 104. The section of code begins at time t0. The profiler 100 may insert and/or execute a block of code 106 that executes when the code section is loaded into the processor instruction stack. The block of code 106 will typically record the value of a high-resolution clock (e.g., CPU clock). This measurement is stored in a memory location 108 maintained by the profiler. Similarly, just before exiting the code section, a second block of code 110 is executed to measure the exit time. This exit time may be stored in second profiler memory location 112. The insertion/execution of blocks code (e.g. blocks 106, 110) for purposes of profiling is known as "instrumenting."

With the two recorded measurements 108, 112, the profiler 100 determines the time elapsed and adds the result to the appropriate CPU time accumulator 102. The profiler 100 may simply subtract the values (i.e., t=t3−t0) to determine an elapsed time, and this will produce a correct result for the illustrated thread 104. However, when this same technique is applied to another thread 113 that has the same entry/exit values of t3 and t0, the result will be incorrect. This is because, during the execution of thread 113, an event 114 interrupted the thread, placing it in an idle state.

The event 114 may be any processor-related event that suspends the execution of a thread 113, including hardware/software interrupts and/or thread switching that result in executing instructions of parallel process or thread. The time period of the event 114 is equal to t2−t1, although the profiler 100 may not be able to measure this time because the event causing the activity may be outside the control of the profiler. Therefore it will be appreciated that even though the elapsed time may be an accurate measurement of the passed clock time, for some cases the profiler 100 will not get an accurate CPU time measurement if it relies solely on elapsed time.

Figure 2:
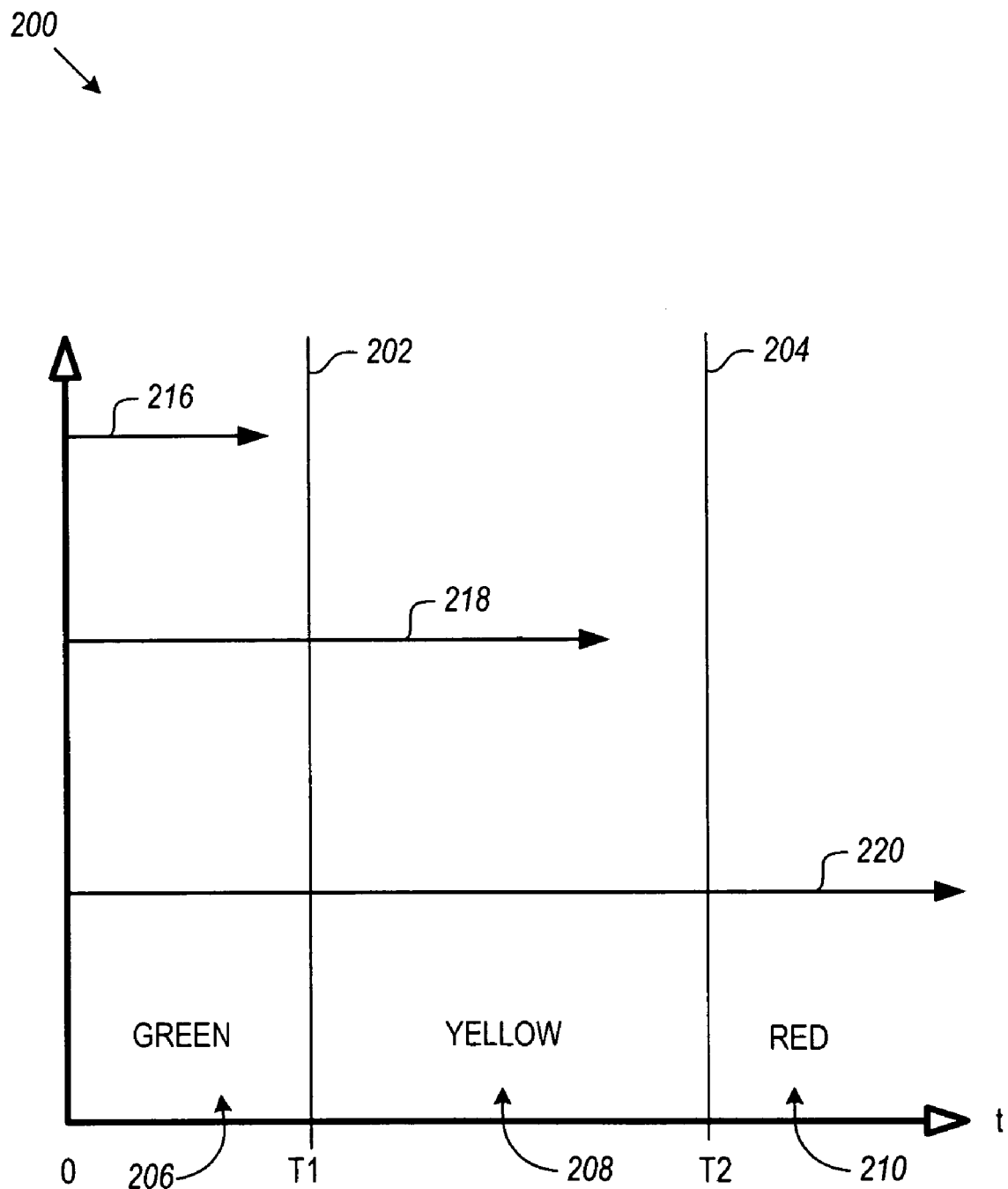
FIG. 2 illustrates thread timing classifications according to embodiments of the present invention.

In reference now to FIG. 2, a diagram 200 illustrates how a profiler according to embodiments of the invention can more accurately measure CPU time of a thread. The diagram 200 includes two time thresholds 202, 204 corresponding to time values T1 and T2, respectively. The time value T1 is a measurement of elapsed time that is of low enough value that it is unlikely that the thread was idle during the elapsed time. The value of T1 may be predicted based on the characteristics of the segment of code instrumented, such as number of instructions and type of instructions. The value of T1 may also be based on the hardware in which the code is running. For example, the value of T1 can be selected as the minimum time required for the operating system kernel to execute two thread switches.

An elapsed time measurement having a value greater than T2 can be safely assumed to include at least some time in which the thread was idle. Generally, T2 should be selected in such a way that it is very unlikely (if not impossible) for any thread of the application to consume T2 or more units of CPU time between any pair of two consecutive instrumentation/measurement points. With some instrumented code, the maximum-length instruction path a CPU can take between two consecutive measurement points may be calculated, and this value may be selected as T2. For example, where there are no program loops occurring between two measurement points, the maximum run time between the points may be predictably calculated. Even where there are loops between instrumentation points, there may be a predictable maximum times the loops can execute. In such a case, a maximum execution time may be determined, and this maximum execution time may be used as T2.

If the paths between instrumentation points are such that an estimation of runtimes cannot be made, the selection of the T2 value may be made based on knowledge of the application. This may be achieved, for example, by using "rules of thumb" based on instruction count and/or instruction types. In another example, the program may be put through a number of calibration runs using identical inputs. A statistical analysis of thread run times obtained from calibration runs may be sufficient to identify outliers that can be used as values of T2 for one or more threads.

The values of T1 and T2 are useful in accepting or rejecting elapsed time measurements made by a profiler. In particular, elapsed time measurements of threads can be broken into three zones, herein referred to as a green zone 206, a yellow zone 208, and a red zone 210. A time measurement, such as time 216, having value of less than T1 is in the green zone 206. Green zone measurements are assumed to be accurate and are added without changes to the accumulated CPU usage time of a thread.

Time measurements falling within the yellow zone 208 are those measurements that have a time value greater than T1, but less than T2. The elapsed time 218 is representative of a yellow zone measurement. The yellow zone elapsed time 218 may or may not be an accurate measure of the used CPU time. For example, a section of code may contain a loop (e.g., a "while" loop in C or Java) that typically executes once or never, and this section of code normally executes with an elapsed time less than T1 (in the green zone 206). However, during a particular input condition, the loop may execute numerous times, causing the elapsed time of the section of code to fall within the yellow zone 208. A yellow zone elapsed time measurement, therefore, may be considered as a measurement that is atypical, but not necessarily inaccurate.

The yellow zone may generally be used for cases where the code instrumentation is incomplete, such as when the application uses an uninstrumented library, or when loops between instrumentation points remain uninstrumented. The profiler has the option of always rejecting yellow zone time measurements as the used CPU time, and instead adding some predetermined value, or epsilon, to the accumulated thread CPU times.

The value of epsilon represents the "typical" CPU time required to execute the particular piece of code in question. The value of epsilon can be found as the average CPU time required to execute the particular fragment of code in the past, if the profiler keeps track of CPU times consumed between different instrumentation/timer-retrieval points. However, such bookkeeping is not always practical, because it increases the profiler overhead and can lead to high memory consumption.

Another approach to determining epsilon, albeit entailing some loss of accuracy, is to assume that epsilon depends only on the current instrumentation point, i.e. it depends on a single point only as opposed to a pair of points. For example, when the measurement takes place at the exit from a function from the math library, it may be assumed that the CPU consumption has been high, and a large value of epsilon is used, perhaps even equal to the elapsed time. Another solution may be to maintain a counter of runnable threads for the given application. Then the formula $$CPU\ Time = \frac{Elapsed\ Time * Number\ CPUs\ in\ the\ system}{Number\ of\ runnable\ threads}$$

can be used to determine the value of epsilon.

A final approach in determining epsilon is to use a constant value, regardless of the circumstances. This value can be anything from zero to T1. The selection of the constant can take place after some tests with various values are run. Practical experience has shown that very small values work best, but this may depend on the type of application and the type of instrumentation applied to the code.

As previously described, the profiler may choose epsilon as CPU time for any and all yellow measurements (e.g., elapsed time 218). However, this may lead to underestimation of CPU time, because many yellow zone measurements may be an accurate reflection of CPU time. In another profiler configuration, the profiler may check additional conditions that are used to determine whether the measured time 208 can be considered an accurate representation of the used CPU time, and therefore use the measured time without adjustment. If the additional conditions have occurred, then epsilon is added to the accumulated CPU time, otherwise the measured elapsed time 218 is added to the accumulated CPU time.

The purpose of checking the additional condition in a yellow zone measurement 218 is to assess the likelihood of the thread becoming idle on its own request, i.e., because of a synchronous event encountered by the thread. Such an event may be an invocation of an I/O operation, page fault, a system call, etc., causing the thread to sleep. Even if the occurrence of such events cannot be confirmed with 100% certainty, a useful heuristic approach can often be applied for a specific combination of the platform and programming language used.

For example, when using C/C++, most, if not all, operations causing a thread to become idle are accessed via special libraries, often called system libraries or runtime libraries. If the time measurement takes place on entry/exit of a function, the address of this function can be made available to the profiler. By keeping a map of loaded libraries, the profiler can identify whether a function in question belongs to a system library. If it does, it is possible that the given function was invoked as an interface to the operating system kernel and therefore could cause the thread to become idle for a short period of time.

Another mechanism which can be used by the profiler to check conditions of yellow zone measurements 218, is to instrument all calls to the system libraries (during compilation or during the linking) in such a way that a call count to the system libraries (e.g., 'library_call_count') is maintained for each thread. The instrumentation required for such a 'library_call_count' increments the value by one every time a call to any function from the library is made. Additional selection can be made based on the name of the function—some functions may be known never to suspend the thread (so called "non-blocking" functions). The algorithm to analyze the elapsed time can be then modified to save not only the 'last_clock' observed, but also a 'last_library_call_count'.

If the elapsed time falls into the yellow zone 208, the current call count can be compared against the 'last_library_call_count'. If they are the same, there is no indication that the thread could have become idle during the execution of the last code fragment. Similar mechanisms may be implemented for Java. In Java, the thread can become blocked only as a result of invoking one of the well-defined methods from the standard 'java.*' package, or as a result of a Java-to-native ("JNI") call. Both cases can be detected by the profiler because the names and signatures of the methods are available at runtime. In such a case, a call count to the standard methods and native methods can be maintained and used as described in the previous paragraph. Other Java events not explicitly invoked by the user's source code may also be detected in this way, such as calls to the "garbage collector."

The third measured elapsed time 220 is representative of a red zone time measurement. Red zone times are those having time values that exceed T2. The profiler may assume that a measurement such as 220 is an inaccurate used CPU time on its face, reject the measurement 220, and add epsilon to the accumulated CPU time. In this way, the measurement 220 will still contribute to the accumulated thread time by the value of epsilon, but will not skew the results due to an unusually long idle time.

It will be appreciated that the profiler may implement variations on the above described procedures. For example, the values of T1, T2, and epsilon may be any combination of constant and variable values. If any of the values are constant, they may be static or predetermined before run time. Constants determined before run-time may be found using various factors as system configuration (e.g., number of processors, number of processor execution pipelines), runtime environment (e.g., operating system, thread libraries, instrumentation used), initial code analysis (e.g., instruction line count), and the granularity of the measurements.

The values of T1, T2, and epsilon may also variable, such that they may be adjusted at run-time during profiling. They may be adjusted based on such factors as runtime conditions (e.g., number of concurrently executing threads at a given time) and statistics gathered during run-time.

Generally, to gather thread CPU usage measurements, a profiler will "instrument" the code. Instrumenting the code involves inserting and/or executing additional instructions at various points within the code. Listing 1 below illustrates a pseudo-code example of profiler instrumentation code that may be used by each thread to initiate a CPU timer. Upon startup, each thread initializes its CPU timer, and saves the current value of the clock time. The code of Listing 2 may be placed wherever a thread is instantiated, such as object constructors. In non-object-oriented languages, the initiation code may be inserted in functions where memory is allocated for various thread structures (e.g., pthread_create function in POSIX thread libraries).

LISTING 1

```
CPU_timer = 0;// The CPU timer for this thread.
last_clock = clock_timer ();
```

The "clock_timer" function in Listing 1 provides a high-resolution clock time. The variables "CPU_timer" and "last_clock" are thread-local, i.e., each thread will access its private copies of these variables. When the thread enters a measured section of code, it updates the value of "last_clock" by a subsequent call to the "clock_timer" function. After the thread exits the code section, it may update the virtual CPU timer by executing a routine such as shown in Listing 2.

LISTING 2

```
current_time = clock_timer ();
if (current_time – last_clock < T1) {
    // This is the green zone - the thread was
    // running
    CPU_timer += current_time – last_clock;
} else if (current_time – last_clock < T2) {
    // This is the yellow zone
    if (circumstances_indicate_idle_thread () {
        CPU_timer += epsilon;
    }
    else {
        CPU_timer += current_time – last_clock;
    }
}
else {
```

-continued

LISTING 2

```
    // This is the red zone
    CPU_timer += epsilon;
}
```

Most profilers measure the time on the function/method/routine basis, so the actions described above are typically performed whenever a function call or a function return is executed. As previously mentioned, there may be additional points in program execution when the instrumentation code is executed, such as loop iterations or basic block entry/exit points.

Figure 3:
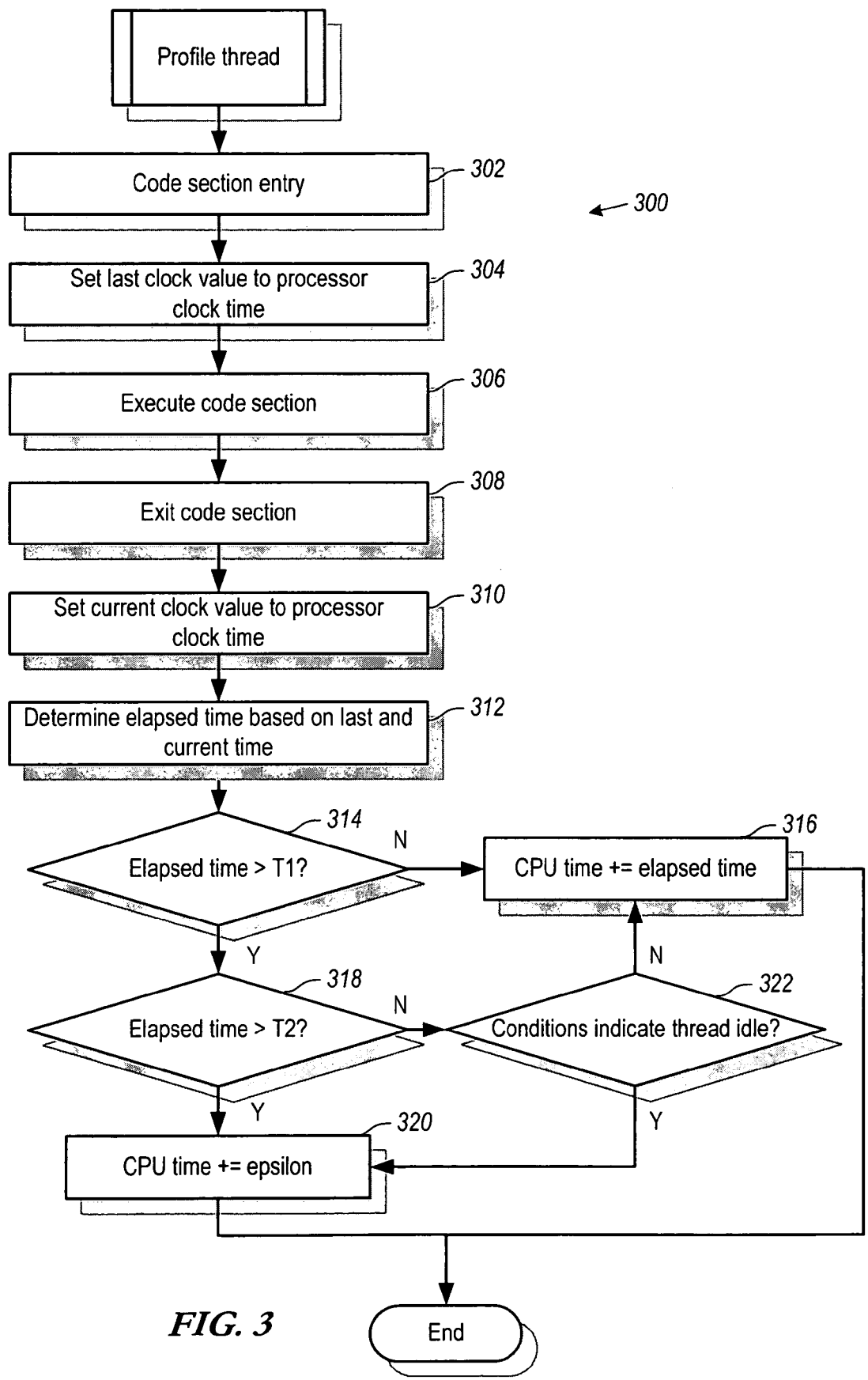
FIG. 3 illustrates steps in a thread profiling method according to embodiments of the present invention.

Referring now to FIG. 3, a flowchart illustrates a thread CPU profiling routine 300 in accordance with embodiments of the present invention. It may be assumed that values of T1 and T2 have been determined as described above prior to execution of the profiling routine 300. The routine 300 begins when the appropriate code section is entered (302) and the last clock value is recorded (304). The measured section of code executes (306), and upon exit (308), the current clock time is recorded (310). The elapsed time is calculated (312) based on the last and current times (e.g., elapsed_time=current_time-last_time).

The elapsed time is compared (314) to T1, and if less than T1, the elapsed time is added (316) to the thread's CPU time. If the elapsed time is greater than T1, it is compared (318) to T2. If the elapsed time is greater than T2, epsilon is added (320) to the thread's CPU time. If the elapsed time compared (318) and found less than T2, other conditions are checked (322) to determine whether the thread was significantly idled during the elapsed time. If the conditions indicate the thread was significantly idled, epsilon is added (320) to the thread's CPU time. Otherwise, the elapsed time is added (316) to the thread's CPU time.

Figure 4:
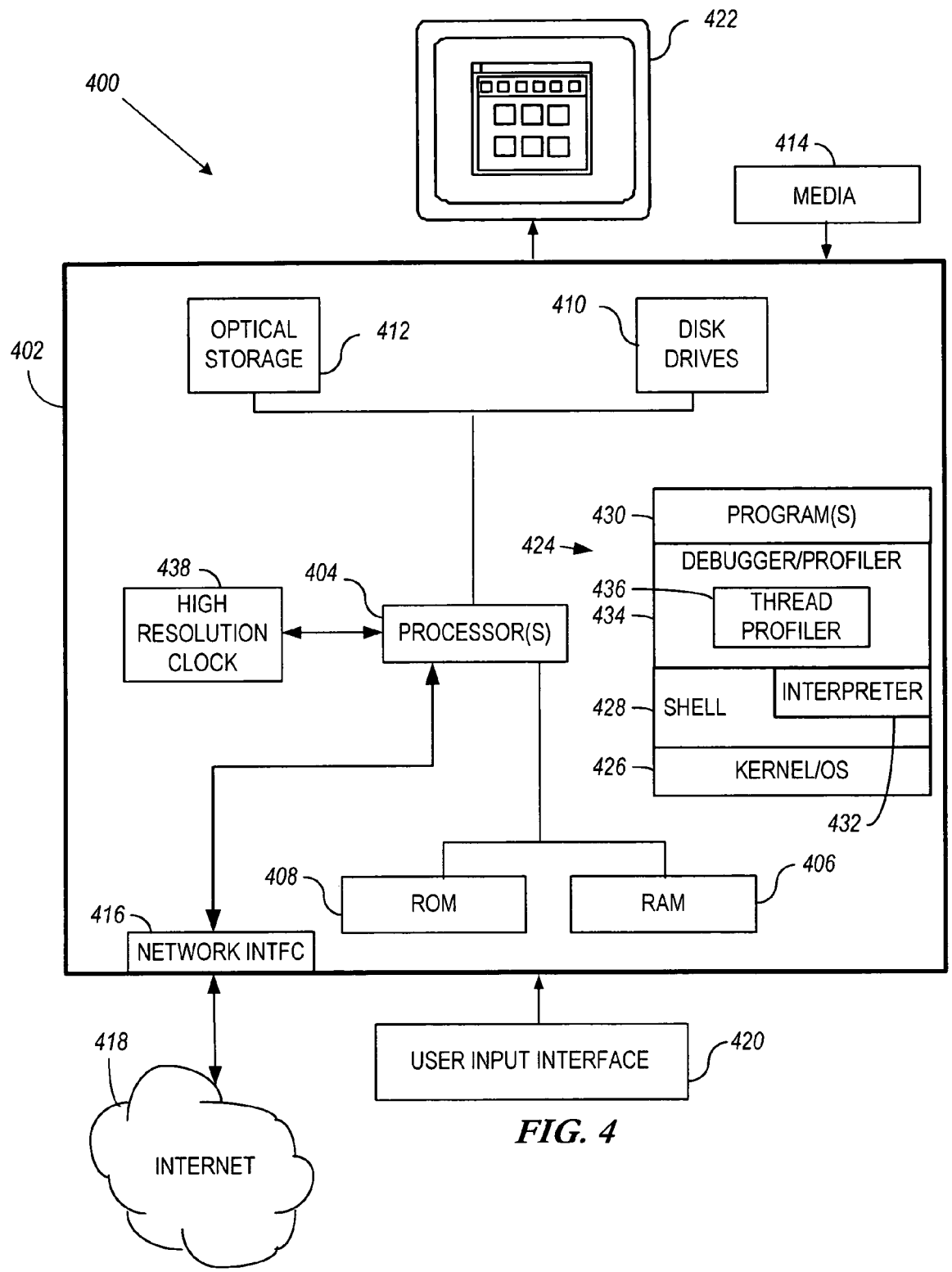
FIG. 4 illustrates an apparatus for profiling thread usage according to embodiments of the present invention.

In reference now to FIG. 4, a computing arrangement 400 is shown for profiling thread CPU time according to embodiments of the present invention. The computing arrangement 400 includes data processing hardware 402 that has one or more processors 404 coupled to various forms of memory. The processor(s) 404 are arranged to execute instructions stored on or provided by such memory. Memory accessible by the processor(s) may include random access memory (RAM) 406, read-only memory (ROM) 408, disk drives 410, optical storage 412 (e.g., CD-ROM, DVD), etc. The processor(s) 404 may also access data via memory available on removable media 414, such as floppy disks, Zip disks, flash memory, etc. The processor(s) 404 may also execute instructions received via a network interface 416. The network interface 416 may be data coupled to any data transfer network such as a local area network (LAN), wide area network (WAN) or global area network (GAN) such as the Internet 418.

The data processing hardware 402 may include and/or be coupled to a user input interface 420 and an output device 422 (e.g., a monitor) for interacting with users. The data processing hardware 402 includes software 424 that may be provided in the form of instructions executable by the processor(s) 404. Generally, the software 424 includes an operating system 426 for the control and management of hardware 402 and basic system operations, as well as running applications. The operating system 426 may include any type of kernel (e.g., monolithic kernel, microkernel, exokernel, etc.) and user interface software such as a shell 428 and/or graphical user interface (GUI). The operating system 426 includes facilities for running, via the processor(s) 404, threads of one or more multi-threaded programs 430.

The programs 430 may be run as binary instructions via the shell 428 or by interpreted instructions that are executed via an interpreter 432. For example, a natively compiled executable includes processor-specific binary instructions that may be executed via the shell 428 (or, in some instances, by the kernel 426). In contrast, an interpreted language such as Java uses specially formatted interpreter instructions (e.g., bytecodes) that are read by an interpreter 432 (e.g., a Java virtual machine) which converts the interpreter instruction to native processor instructions.

The programs 430 may interface with a debugger/profiler 434 for analyzing various aspects of programs 430. The debugger/profiler 424 may execute the programs 430 in a specially controlled run-time environment, or may alter (e.g., instrument) the program code so that profiling operations occur in the normal run-time environment of the program 430.

The debugger/profiler 434 includes a thread profiler 436 for measuring CPU time consumed by individual threads of a program 428. The thread profiler 436 may access a high-resolution clock 438 for determining start times and stop times associated with the execution points of a thread. The thread profiler 436 may execute instructions on the processor(s) 404 for determining elapsed times based on the start and stop times, and determining for each elapsed time whether the thread was idle during the elapsed time by comparison of the elapsed time to threshold values (e.g., T1 and T2). Elapsed times during which the thread was idle may be reduced by a selected amount by the thread profiler 436.

The thread profiler 436 may utilize the processor(s) 404 in concert with memory (e.g., RAM 406) to determine and store value indicatives of processor usage by the thread as a function of the elapsed times. The elapsed times determined by the thread profiler 436 may be used by other system components (e.g., the debugger/profiler 434, programs 430, etc.) to provide CPU usage statistics on a per-thread basis. These statistics may be placed in persistent storage (e.g., disk drives 410) and/or displayed by a user via an output device 422 or other user interface known in the art.

It will be appreciated that the arrangement and composition of the hardware 402 and operating system 426 may differ from that described in relation to FIG. 4. It will be apparent to those skilled in the art that the descriptions provided herein of the thread profiler 436 and related software are independent of any particular configuration of the computing arrangement 400 or its operating environment.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

It will be appreciated that processor-based instructions for implementing embodiments of the invention are capable of being distributed in the form of a computer readable medium of instructions and a variety of other forms. The description herein of such processor-based instructions apply equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-based method for determining processor usage by a thread, comprising:

determining elapsed times between execution points of the thread based on start times and stop times associated with the execution points, wherein each execution point is an instruction in program code;

determining for each elapsed time whether the thread was idle during the elapsed time by comparison of the elapsed time to a first threshold value;

reducing to a selected value each elapsed time for which the thread was determined to be idle, wherein the reducing includes, reducing to the selected value each elapsed time that exceeds a second threshold value, wherein the second threshold value is greater than the first threshold value, and reducing to the selected value each elapsed time that exceeds the first threshold value and does not exceed the second threshold value if a condition was detected that indicates the thread was idle during each elapsed time; and determining a value indicative of processor usage by the thread as a function of the elapsed times.

2. The method of claim 1, wherein the condition comprises a processor interrupt.

3. The method of claim 1, wherein the condition comprises a context switch between threads of execution of a processor.

4. The method of claim 1, further comprising determining the second threshold value based on a maximum-length instruction path between execution points of the thread.

5. A processor-based method for determining processor usage by a thread, comprising:

determining elapsed times between execution points of the thread based on start times and stop times associated with the execution points, wherein each execution point is an instruction in program code;

determining for each elapsed time whether the thread was idle during the elapsed time by comparison of the elapsed time to a first threshold value, wherein the first threshold value comprises a minimum time required for an operating system kernel running the thread to execute two thread switches;

reducing to a selected value each elapsed time for which the thread was determined to be idle; and determining a value indicative of processor usage by the thread as a function of the elapsed times.

6. The method of claim 5, wherein the threads comprise threads running in a Java virtual machine.

7. The method of claim 5, wherein determining elapsed times comprises determining the elapsed time using a high-resolution clock.

8. The method of claim 7, wherein the high-resolution clock comprises a CPU clock.

9. The method of claim 5, wherein the execution points comprise entry points and exit points of functions called by the thread.

10. A computer-readable storage medium configured with instructions for causing a processor of a data processing arrangement to perform steps comprising:
    running a thread of a multi-threaded program;
    determining elapsed times between execution points of the thread based on start times and stop times associated with the execution points;
    determining for each elapsed time whether the thread was idle during the elapsed time by comparison of the elapsed time to a first threshold value;
    reducing to a selected value each elapsed time for which the thread was determined to be idle, wherein the reducing includes,
        reducing to the selected value each elapsed time that exceeds a second threshold value, wherein the second threshold value is greater than the first threshold value, and
        reducing to the selected value each elapsed time that exceeds the first threshold value and does not exceed the second threshold value if a condition was detected that indicates the thread was idle during each elapsed time; and
    determining a value indicative of processor usage by the thread as a function of the elapsed times.

11. The computer-readable storage medium of claim 10, wherein the condition comprises a processor interrupt.

12. The computer-readable storage medium of claim 10, wherein the condition comprises a context switch between threads of execution of the data processing arrangement.

13. The computer-readable storage medium of claim 10, wherein the steps further comprise determining the second threshold value based on a maximum-length instruction path between execution points of the thread.

14. A computer-readable storage medium configured with instructions for causing a processor of a data processing arrangement to perform steps comprising:
    running a thread of a multi-threaded program;
    determining elapsed times between execution points of the thread based on start times and stop times associated with the execution points;
    determining for each elapsed time whether the thread was idle during the elapsed time by comparison of the elapsed time to a first threshold value, wherein the first threshold value comprises a minimum time required for an operating system kernel of the data processing arrangement to execute two thread switches;
    reducing to a selected value each elapsed time for which the thread was determined to be idle; and
    determining a value indicative of processor usage by the thread as a function of the elapsed times.

15. The computer-readable storage medium of claim 14, wherein the threads comprise threads running in a Java virtual machine.

16. The computer-readable storage medium of claim 14, wherein determining elapsed times comprises determining the elapsed time using a high-resolution clock.

17. The computer-readable storage medium of claim 16, wherein the high-resolution clock comprises a CPU clock.

18. The computer-readable storage medium of claim 14, wherein the execution points comprise entry points and exit points of functions called by the thread.

19. An apparatus comprising:
    a processor for running a thread of a multi-threaded program;
    means for determining elapsed times between execution points of the thread based on start times and stop times associated with the execution points;
    means for determining for each elapsed time whether the thread was idle during the elapsed time by comparison of the elapsed time to a first threshold value, wherein the first threshold value comprises a minimum time reacquired for an operating system kernel running the thread to execute two thread switches;
    means for reducing to a selected value each elapsed time for which the thread was determined to be idle; and
    means for determining a value indicative of processor usage by the thread as a function of the elapsed times.

* * * * *

UNITED STATES PATENT AND TRADEMARK OFFICE
CERTIFICATE OF CORRECTION

| | |
|---|---|
| PATENT NO. | : 7,426,731 B2 |
| APPLICATION NO. | : 10/805934 |
| DATED | : September 16, 2008 |
| INVENTOR(S) | : Piotr Findeisen |

It is certified that error appears in the above-identified patent and that said Letters Patent is hereby corrected as shown below:

In column 12, lines 36-37, in Claim 19, delete "reacquired" and insert -- required --, therefor.

Signed and Sealed this

Twenty-eighth Day of July, 2009

JOHN DOLL
*Acting Director of the United States Patent and Trademark Office*